April 27, 1965   G. J. LEIGHTON   3,180,985
STANDARDIZATION OF RADIATION-ABSORPTION TYPE DENSITY GAGES
Filed May 14, 1962
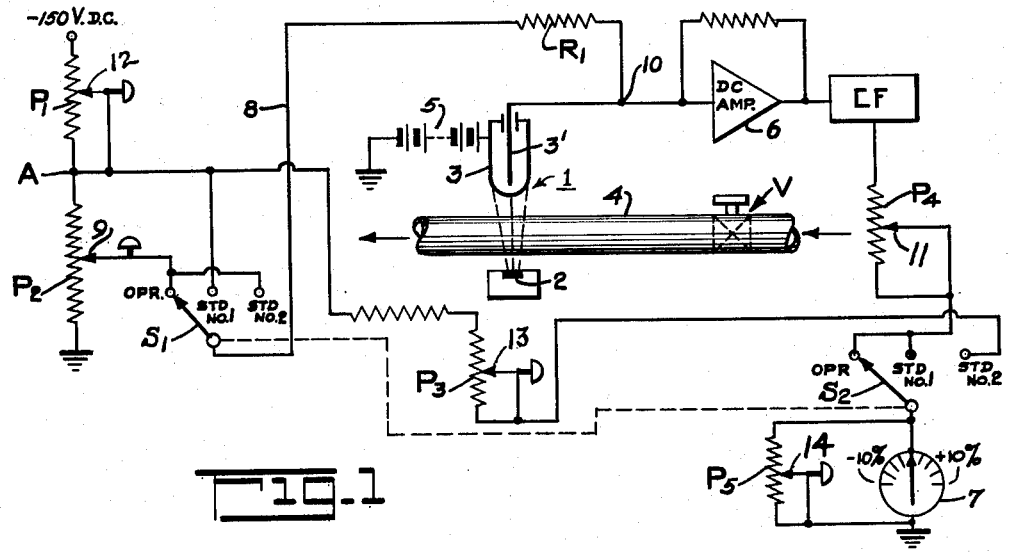
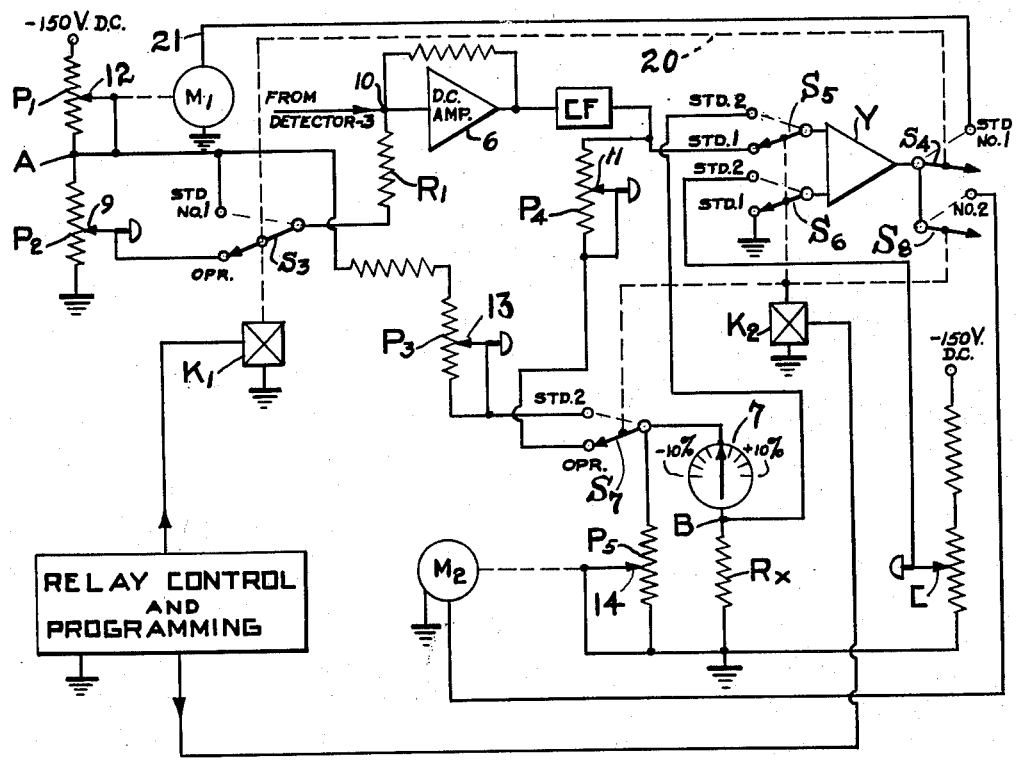
INVENTOR.
GEOFFREY J. LEIGHTON
BY
HIS ATTORNEY

United States Patent Office 3,180,985
Patented Apr. 27, 1965

3,180,985
STANDARDIZATION OF RADIATION-ABSORPTION TYPE DENSITY GAGES
Geoffrey J. Leighton, Trenton, N.J., assignor, by mesne assignments, to Electronic Automation Systems, Inc., a corporation of New York
Filed May 14, 1962, Ser. No. 194,294
4 Claims. (Cl. 250—43.5)

This invention relates to standardization of gages of the radiation-absorption type, such as density gages, having specific application to continuous density measurement of material moving past a measuring station. The material may be in the form of a sheet or web, or it may have fluid-like characteristics for passing through a pipe line.

Conventional radiation-absorption type gages for measuring thickness and/or density of material in continuous process generally include a radiation source, such as an isotope emitting beta or gamma radiation, depending on the subject material, disposed adjacent to and at one side of the moving material, and a radiation detector such as an ionization chamber disposed at the same or opposite side of the material so as to receive reflected or transversely transmitted unabsorbed radiation, as the case may be. The radiation absorbed by the material, with reference to the radiation received by the detector for the "open-gap" or no-material condition, is a function of the thickness or density of the material.

An important problem in the use of such gages involves "source decay," i.e. weakening of the radiation source with age, or partial shielding of the source by foreign material, dust, etc. Accordingly, it is necessary periodically to recalibrate the gage so as properly to relate the indicator reading to the source strength.

In the case of sheet material passing through the air gap between the source and detector, recalibration or standardization has been proposed in a number of ways, such as by using with a single radiation source a pair of ionization chambers in balancing circuitry, shown, for example, in Patent No. 2,675,483, granted April 13, 1954 to Leighton et al; also by using a single detector and source in circuitry having amplifier zero-standardization, automatically controlled according to recorder output, as in Patent No. 2,829,268, granted April 1, 1958 to H. R. Chope. Systems of this type, while providing for periodic zeroing of the gage indicator to compensate for source decay, do not take into account the corresponding change in indicator sensitivity for full scale deflection readings.

In another proposed system, the processing machine is periodically shut down, and two differently calibrated absorbers or standard samples are sequentially inserted in place of the subject material for calibrating purposes. In practice, this calibration, while providing proper standardization by relating the adjustments that compensate for source decay and meter sensitivity decay respectively, is often difficult to perform and results in long shutdown periods.

Accordingly, these prior art systems have individually or collectively a number of disadvantages, including excessive shutdown time of the processing machine, inadequate compensation at the gage indicator or meter for source decay, and limited flexibility of application in the continuous production of certain materials. Where the material under measurement, for example, is passing through a pipe line, the conventional sheet-thickness measurement gage is unsuitable for practical reasons.

In accordance with the present invention, the density of a material passing through a measuring station of the character described can be directly measured and the gage maintained in proper calibration by brief and simple periodic adjustments, once the initial or basic standardization has been done. To this end, a comparatively simple simulation technique is used to eliminate the necessity for repeated, laborious, and time-consuming recalibrations by standard absorbers.

Prior to starting the process, with the "pipe line" empty, i.e., the no-material condition, the gage circuitry is initially balanced in known manner to "zero" the indicator. This is a mid-point indication, providing for "plus" and "minus" readings. The "pipe" is then filled with standard sample material of known median density, using, say reference 1.0, and the circuitry is again adjusted to zero the density indicator. For making the desired indicator sensitivity adjustments, the pipe is then emptied of the standard sample material and refilled with a second standard sample material having known deviation from median (1.0), such as by +10% or −10%. Using the second sample, the gage is then adjusted to give full scale deflection (FSD) of the indicator, say +10%. The essential requirements are now satisfied for relating the indicator or meter sensitivity to the source strength for the empty-pipe or open-gap condition.

All subsequent standardization may now be accomplished simply by emptying the pipe line for a brief period and adjusting the gage circuitry first to give zero indication under the empty-pipe condition, and then adjusting for sensitivity to give full scale deflection. This eliminates further necessity for using standard samples with attendant long shutdown. The normal processing and measuring operations are then resumed until the next brief standardizing operation.

A principal object of this invention therefore is to provide an improved method of standardizing density gages of the radiation-absorption type for accurately measuring the density of material passing through the measuring station that materially reduces shutdown time required for standardization, provides complete indicator sensitivity compensation, and that is simple, direct, and efficient.

The invention will be more fully set forth in the following description referring to the accompanying drawing, and the features of novelty will be pointed out with particularity in the claims annexed to and forming a part of this specification.

Referring to the drawing, FIG. 1 is a partly diagrammatic illustration of a radiation-absorption type density gage applied for purposes of illustration to material having fluid-like characteristics passing through a pipe or conduit, for practicing the present invention by manual standardizing control, and FIG. 2 illustrates the pertinent parts of the gage of FIG. 1 adapted for automatic standardizing control, following the basic adjustment.

Referring to FIG. 1, the measuring system indicated at 1 comprises a radiation source 2 which may comprise an isotope emitting beta or gamma type radiation, depending on the measuring requirements, and a detector 3 which may comprise an ionization chamber of well-known type. In the present instance, the source and detector are disposed adjacent to and at opposite sides of a conduit or pipe 4, through which material whose density is to be measured is moved (as indicated by the direction arrows) past the measuring station 1. The pipe 4 may be suitably provided with control valves, one of which is indicated at V, for emptying and refilling the pipe at the measuring station.

The basic operation of the radiation-absorption type gage for non-contact measurement of thickness or density is well known. Assuming a given source radiation rate, the radiation received at the ionization chamber, which represents the difference between the source radiation and the radiation absorbed by the "pipe line," taking into account the no-material or open-gap condition, is a function of the density of the material to be measured. The gage circuitry insofar as normal measuring is concerned is shown as generally conventional. The conducting casing of the ionization chamber is connected to a suitable D.C. energizing potential 5, and the insulated probe 3' is connected to the input of a standard D.C. amplifier 6 and cathode follower CF. The output of CF is connected as presently described to the gage indicator or meter 7 that is indexed for center zero reading, with FSD including arbitrary limits, such as −10% and +10% as indicated.

The meter sensitivity is in the present instance adjusted by means of a variable resistor or potentiometer (hereinafter for convenience called "pot") and slider $P_5$ connected across the meter terminals. It should be understood that the term "potentiometer" or "pot," as used herein, is intended to comprehend any suitable variable resistance unit.

Referring again to the detector 3, the probe 3' is also connected through a high resistance $R_1$, lead 8, calibrating switch $S_1$ shown in operating (OPR) position, and a variable D.C. pot $P_2$ to ground. The potential derived at the slider 9 of the pot $P_2$ is in "bucking" or opposing relation to the potential across the high resistance $R_1$ produced by flow of ionization current through $R_1$.

Assuming for the moment a normal operating condition for measuring density of material at the station 1, the difference voltage between the pot $P_2$ voltage at slider 9, and the $R_1$ voltage (or measuring potential) at junction 10 of the detector output lead, is amplified as indicated and connected through CF, a variable pot $P_4$ with slider 11, and standardizing switch $S_2$ (shown also in OPR position) to energize the meter 7. The sense and magnitude of this difference voltage, representing the radiation unabsorbed by the material under measurement, determines the deflection of the meter with reference to its zero position and hence measures the density of the material in comparison to a predetermined standard.

The standardization of the gage for regular operation to compensate for source decay and change in meter sensitivity will now be described:

*Step No. 1.*—The pipe line is first emptied, and the ganged calibration switches $S_1$ and $S_2$ are set at the No. 1 standardizing positions indicated. The pot $P_1$ (which is connected at its upper terminal to a suitable D.C. bucking voltage, such as −150 volts, for example, and at its lower terminal to a reference junction point A between the pots $P_1$ and $P_2$) is adjusted so that the amplifier output is zero, indicated by zeroing of the meter 7. This adjustment determines the zeroing setting of pot $P_1$ for subsequent operation until the next periodic recalibration.

*Step No. 2.*—The meter sensitivity is now reduced to a sensitivity factor of 2 by adjustment of the meter pot $P_5$.

*Step No. 3.*—The pipe line is now filled with a first standard sample material of known median density, represented as density 1.0, for example. The calibrating switches $S_1$ and $S_2$ are then placed in the OPR positions, and the pot $P_2$ adjusted until the meter 7 again reads zero. This is a so-called "weighting" adjustment and determines the preset position of pot $P_2$ for all subsequent operation until a new basic standardization is required.

*Step No. 4.*—The pipe line is emptied again and refilled with a second standard sample material having a known deviation from density 1.0, such as either −10% or +10% deviation. The meter is now adjusted to read FSD (either −10% or +10%, as the case may be) by adjustment of pot $P_4$ in the meter energizing circuit.

*Step No. 5.* The calibration switches are next set at the standardizing No. 2 positions, and the pot $P_3$, which is directly connected between the reference junction A, and the standardizing No. 2 contact of switch $S_2$, is adjusted so that the meter 7 again reads FSD. The voltage at A, which is used henceforth as a reference voltage, is thus modified by pot $P_3$ to calibrate the meter sensitivity for FSD.

*Step No. 6.*—The pipe line is again emptied, and the calibrating switches returned to the OPR positions. The gage is now properly standardized for both empty-pipe, or zero, and FSD indications.

*Step No. 7.*—The pipe is now refilled with material of unknown density to be measured, and normal measuring operation can be resumed. For the duration of such operation and until recalibration is indicated (depending on the half-life characteristics of the radiation source), the meter 7 indicates accurately the measured density throughout the FSD range.

Once the initial or basic standardization using two standard samples has been done, the gage remains preset as to pots $P_2$, $P_3$, and $P_4$, so that subsequently a comparatively simple and brief recalibration can be performed, involving but the following steps:

*Step No. 1.*—The pipe is emptied of the material under measurement.

*Step No. 2.*—The calibration switches $S_1$ and $S_2$ are set at standardizing No. 1 positions, and pot $P_1$ readjusted so that the meter 7 is zeroed.

*Step No. 3.*—The calibration switches are reset at the standardization No. 2 positions, and the meter sensitivity pot $P_5$ adjusted so that the meter now reads FSD.

*Step No. 4.*—The calibration switches are returned to the OPR positions, and the pipe refilled with the material to be measured. The normal measuring operation is then resumed.

Thus, the gage circuitry which was preset as above described during basic standardization, now can simulate the use of two separate standardizing sample materials for all periodic recalibrations, assuming of course no change in the kind of material under test. The resulting quick and simple recalibration thereby avoids several hours of shutdown time that is generally required for each periodic dual-sample standardization. By contrast, periodic recalibration according to the present invention can be accomplished within several minutes, either manually or automatically.

A significant feature of the present invention is the use of an established reference voltage that is related to the empty-pipe condition for properly adjusting the meter sensitivity. The voltage at point A is equal in magnitude to the voltage generated by the ionization current for the empty-pipe condition. As the source decays exponentially, the voltage at A accordingly decreases exponentially. Thus, by using the voltage at A as a reference to re-establish the meter sensitivity, accurate reading of the gage indicator is ensured at all times thoughout the FSD range, including 1.0 (zero position) and ±10%.

Although many prior systems standardize for the zero point, the FSD reading will not be accurate unless provision is made to restandardize the sensitivity of the indicator, which also decreases exponentially as the source decays.

Automatic performance of the periodic recalibrations following the basic gage standardization is generally preferred for most installations. An automatic system for this purpose is shown by FIG. 2 which includes essentially the basic circuitry and calibration switches shown in FIG. 1.

Referring specifically now to FIG. 2, it will be recalled that the pots $P_2$, $P_3$, and $P_4$ are preset during the basic standardization of the gage for measuring the kind of material in question. Accordingly, periodic automatic operation can be limited to the adjustment of the pots $P_1$ and $P_5$ as previously explained.

To this end, the pot $P_1$ is adapted to be adjusted by a suitable servo motor $M_1$, and the pot $P_5$ is adapted to be adjusted by a similar servo motor $M_2$. These motors may be of well-known A.C. type for null-position operation, i.e. the motor is energized by a signal of given sense to rotate in a direction for decreasing the motor input signal; thus, the motor tends to zero itself.

The motors $M_1$ and $M_2$ are controlled according to the operation of a pair of calibration relays, $K_1$ and $K_2$, respectively, and these relays, as well as the pipe line valves, are in turn suitably controlled by conventional programming means, as indicated.

Periodic recalibration is initiated by first emptying the pipe line, and then operating after a suitable interval (allowing for emptying of the line) the relay $K_1$. This sets the switch $S_3$ at the standardizing No. 1 position, thereby transferring the input circuit of the D.C. amplifier 6 from the pot $P_2$ to pot $P_1$ at junction A.

At the same time, relay $K_1$, through a suitable mechanical connection indicated at 20, also sets the switch $S_4$ at its standardizing No. 1 position, thereby connecting the motor $M_1$ through lead 21 to the output of a conventional A.C. converter-amplifier unit Y. This unit is in turn normally connected to the output of the D.C. amplifier 6 and CF through the $K_2$ relay switch $S_5$ at its No. 1 position. Relay $K_2$ at this stage remains unoperated. Thus, any gage output error signal appearing at the unit Y is converted to A.C. and amplified to operate the A.C. servo motor $M_1$ through the switch $S_4$. Pot $P_1$ is accordingly adjusted by the motor $M_1$ until the error signal from CF is zero, thereby zeroing the meter 7 that is also connected as previously described to the output of CF.

Relay $K_1$ is now deenergized after a suitable interval, depending on the adjusting speed of motor $M_1$, thereby returning switches $S_3$ and $S_4$ to their original indicated positions. The pipe line is refilled with material to be measured, and, after a required pipe-filling interval, the relay $K_2$ is energized to operate the ganged switches $S_5$ and $S_6$. This transfers the converter Y input from the CF output to balancing circuitry (presently described) at the No. 2 gang-switch positions; also $K_2$ operates the individual switches $S_7$ and $S_8$ to their No. 2 positions, so as to connect respectively the meter 7 to junction A through the pot $P_3$, and the servo motor $M_2$ to the output of the converter Y.

The motor $M_2$ which is connected to adjust the meter sensitiivty pot $P_5$ is now energized by any difference-voltage that appears across the switches $S_5$ and $S_6$, now at the No. 2 positions. This difference, or error signal, is obtained through leads 22 and 23 connected respectively to points B and C, point B having a potential determined by the meter output resistance $R_x$ and the meter current, and point C having a preset known potential that equals in magnitude the potential that should appear at B when the meter is energized to read exactly FSD. The voltages at B and C are opposite in sense so that any variation from standard FSD at B for the new pipe-filled condition results in an error signal at the converter input, thereby causing rotation of the motor $M_2$ in a direction to adjust the pot $P_5$ until the voltage at B equals the voltage at C.

The meter 7 is now recalibrated as to FSD sensitivity, thus completing the new standardization of the gage. Following the adjustment of pot $P_5$, the relay $K_2$ is deenergized thereby to return its switches ($S_5$ to $S_8$) to the No. 1 non-calibrating and/or operating positions. Concurrently, the motor $M_2$ is cut out at the switch $S_8$. The relay $K_1$ and its switches $S_3$ and $S_4$ are already in the normal operating positions as above described, with the motor $M_1$ cut out at switch $S_4$.

The above described periodic automatic recalibration for full scale meter sensitivity is now complete, and the gage is in readiness for normal measuring operation.

The term "pipe line" as used in the specification and claims hereof is not intended to be limited to material moving through a pipe or conduit as such; rather, the term is intended to comprehend, in accordance with the spirit and scope of the invention, a production line of continuously produced material that is moved through the measuring station.

It should be understood that this invention is not limited to specific details of construction and arrangement thereof herein illustrated, and that changes and modifications may occur to one skilled in the art without departing from the spirit of the invention.

What is claimed is:

1. An electrically balanced density gage of the radiation-absorption type for continuously indicating the density of material moving from a production line, said gage including a radiation source and a radiation detector spaced with respect to each other and said line for producing a measuring signal in response to unabsorbed radiation received by the detector, an indicating meter, and combined measuring and calibrating circuitry for compensating for source decay comprising reference potentiometer means adjustable for producing a voltage for balancing the measuring voltage so as to zero the meter for the empty-line condition, said reference potentiometer means being further separately adjustable for producing a balancing voltage again to zero the indicator for a known standard density condition, means for adjusting the meter input circuit from the gage to read full scale deflection for a known density deviation from standard, means for separately modifying the aforesaid reference voltage for directly producing full scale deflection of the meter, and means for independently adjusting the sensitivity factor of the meter.

2. In an electrically balanced density gage of the radiation-absorption type for continuously indicating the density of material moving from a production line, said gage including a radiation source and a radiation detector spaced with respect to each other and said line for producing a measuring signal in response to unabsorbed radiation received by the detector, and an indicating meter, the method of calibrating the gage for source decay which comprises initial basic standardization including
   (a) adjusting the gage according to the radiation received by the detector in the empty-line condition for zeroing the meter,
   (b) adjusting the sensitivity factor of the meter,
   (c) adjusting the gage according to radiation received by the detector for a known standard density of the subject material for zeroing the meter,
   (d) adjusting the meter input according to radiation received by the detector for a known deviation from the aforesaid standard density for producing full scale deflection of the meter,
   (e) separately modifying the aforesaid empty-line zeroing adjustment for directly producing full scale deflection of the meter,
   (f) normally measuring according to radiation received by the detector subject material of unknown density,
and subsequent periodic standardization including
   (g) emptying the line,
   (h) changing the adjustment for the aforesaid empty-line, zero indication of the meter, again to zero the meter,
   (i) adjusting the meter sensitivity for full scale deflection of said empty-line condition, and
   (j) refilling the line with material to be measured for resuming normal operation.

3. In an electrically balanced density gage of the radiation-absorption type for continuously indicating the density of material moving from a production line, said gage including a radiation source and a radiation detector spaced with respect to each other and the line to constitute a measuring station, for producing a measuring signal in response to unabsorbed radiation received by the detector, and an indicating meter, the method of basically and periodically standardizing said density gage to compensate for variation of source radiation due to decay and other factors, which comprises
   (a) initially emptying said line of material,
   (b) producing a reference signal for exactly balancing said measuring signal to zero the meter for the empty-line condition, (c) adjusting the sensitivity factor of the meter for said condition, (d) filling said line with a material of known standard density, (e) applying the reference signal through a first modifying circuit in opposition to the measuring signal again to zero said indicator, (f) emptying the line and refilling with a material having a density of known deviation from the standard, (g) adjusting the gage input signal to the meter to produce full scale deflection according to the known deviation, (h) applying separately the reference signal through a second modifying circuit directly to the meter for producing again full scale deflection of the meter, (i) emptying the line and refilling the line for normal operation with material whose density is to be measured according to the difference between the modified reference zeroing signal and the measuring signal, and subsequently standardizing the gage at desired periodic intervals by (j) emptying the line, (k) adjusting the original reference signal to produce a new reference signal in opposition to the measuring signal for recalibrating the indicator at zero, (l) removing the aforesaid new reference signal from the gage and applying it through said first modifying circuit directly to the meter, (m) adjusting the indicator sensitivity to give full scale deflection for the empty-line condition, (n) restoring the new reference signal through the first modifying circuit to the gage in opposition to the measuring signal, and (o) refilling the pipe line with material to be measured for normal operation.

4. In an electrically balanced density gage of the radiation-absorption type for continuously indicating the density of material moving through a pipe line, said gage including a radiation source and a radiation detector spaced with respect to said pipe line for producing a measuring signal in response to unabsorbed radiation received by the detector, and an indicating meter, the method of standardizing said density gage to compensate for variation of source radiation due to decay and other factors, which consists of performing an initial basic calibration and subsequent periodic recalibrations, the basic calibration comprising the steps:

(a) initially emptying said pipe line of material, (b) producing for the empty-pipe condition a reference signal for exactly balancing said measuring signal for zeroing said meter, (c) adjusting the meter to a desired sensitivity factor, (d) filling said pipe line with a first sample material of standard density, (e) modifying the reference signal to zero said indicator for the standard density condition, (f) removing the standard density material from the pipe line and replacing it with a second sample material whose density deviates by a selected amount from the first standard sample, (g) adjusting the gage input signal to the meter for producing full scale deflection according to the selected deviation, (h) again modifying separately the reference signal directly to produce full scale deflection of the meter, (i) removing the second sample material from the pipe line and refilling for normal operation the pipe line with material whose density is to be measured, and the subsequent periodic calibrations comprising the steps:

(a) emptying the pipe line, (b) adjusting the reference signal to recalibrate the meter at zero for the empty-pipe condition, (c) adjusting the indicator sensitivity to give full scale deflection for the empty-pipe condition, and (d) refilling the pipe line with material to be measured for normal operation.

References Cited by the Examiner
UNITED STATES PATENTS 2,874,354 2/59 Bell _____ 250—83
2,937,276 5/60 Thourson _____ 250—43.5

RALPH G. NILSON, *Primary Examiner.*
ARCHIE R. BORCHELT, *Examiner.*